United States Patent
Brahma

(10) Patent No.: US 7,861,515 B2
(45) Date of Patent: Jan. 4, 2011

(54) MONITORING OF EXHAUST GAS OXYGEN SENSOR PERFORMANCE

(75) Inventor: Avra Brahma, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 808 days.

(21) Appl. No.: 11/777,902

(22) Filed: Jul. 13, 2007

(65) Prior Publication Data

US 2009/0013665 A1    Jan. 15, 2009

(51) Int. Cl.
F01N 3/00 (2006.01)
(52) U.S. Cl. .............................. 60/277; 60/297; 60/285; 60/286; 73/23.32; 73/114.72
(58) Field of Classification Search .................... 60/277, 60/285, 286, 297; 73/23.31, 23.32, 114.69, 73/114.71, 114.72, 114.73, 114.76; 123/674, 123/688, 690; 701/109, 114
See application file for complete search history.

(56) References Cited

U.S. PATENT DOCUMENTS

| | | | |
|---|---|---|---|
| 5,125,384 A | 6/1992 | Tada | |
| 6,711,892 B2 | 3/2004 | Tamura et al. | |
| 6,941,750 B2 | 9/2005 | Boretto et al. | |
| 6,966,179 B2 | 11/2005 | Onodera et al. | |
| 6,968,677 B2 | 11/2005 | Tamura | |
| 7,065,960 B2 | 6/2006 | Gioannini et al. | |
| 2004/0139852 A1 | 7/2004 | Koga et al. | |
| 2006/0016179 A1 | 1/2006 | Okugawa et al. | |
| 2006/0032217 A1 | 2/2006 | Kondou et al. | |

FOREIGN PATENT DOCUMENTS

| | | |
|---|---|---|
| EP | 0555831 | 2/1993 |
| JP | 6229969 | 8/1994 |
| JP | 8121221 | 5/1996 |

OTHER PUBLICATIONS

ISA, United Kingdom Intellectual Property Office, International Search Report of GB0812464.6, Jan. 16, 2009, 1 page.

*Primary Examiner*—Thomas E Denion
*Assistant Examiner*—Jesse Bogue
(74) *Attorney, Agent, or Firm*—Julia Voutyras; Alleman Hall McCoy Russell & Tuttle LLP

(57) ABSTRACT

A method of monitoring a performance of an oxygen sensor is disclosed. One embodiment comprises determining a first air/fuel ratio from a signal from an exhaust oxygen sensor; determining a second air/fuel ratio from a temperature upstream of the particulate filter, a pressure differential across the particulate filter and one or more of an airflow into the engine and a fuel flow into the engine; comparing the first air/fuel ratio and the second air/fuel ratio; and diagnosing an error condition of the oxygen sensor if the first air/fuel ratio does not meet a predetermined condition relative to the second air/fuel ratio.

17 Claims, 3 Drawing Sheets

MONITORING OF EXHAUST GAS OXYGEN SENSOR PERFORMANCE

TECHNICAL FIELD

The present disclosure relates to the monitoring and diagnosis of the performance of an exhaust oxygen sensor in an apparatus having an internal combustion engine.

BACKGROUND AND SUMMARY

Vehicle powertrains are often equipped with exhaust gas oxygen sensors for monitoring an oxygen content of exhaust gases in a vehicle exhaust conduit. Various types of exhaust oxygen sensors are known, including but not limited to universal exhaust gas oxygen (UEGO) sensors. Unlike some exhaust gas sensors that merely indicate a presence or absence of oxygen, UEGO sensors provide an output that is proportional to the concentration of oxygen in the exhaust gas, and thereby allow a ratio of air and fuel supplied to the vehicle engine to be monitored.

However, UEGO sensors may show a large variability in output during lean air/fuel conditions (i.e. during periods of high exhaust oxygen content), and/or with aging. Furthermore, UEGO sensors may show significant drift during periods of elevated exhaust temperature and/or exhaust pressure, for example, during particulate filter regeneration. Improper performance of a UEGO sensor may lead to improper engine operation, as an engine controller may use an output of a UEGO sensor to adjust amounts of air and fuel provided to an engine as driving conditions change.

Therefore, in one approach, problems with the consistency of an oxygen sensor output may be at least partially addressed in an apparatus comprising an internal combustion engine, an exhaust oxygen gas sensor and a particulate filter by determining a first air/fuel ratio from a signal from an exhaust oxygen sensor; determining a second air/fuel ratio from a temperature upstream of the particulate filter, a pressure differential across the particulate filter and one or more of an airflow into the engine and a fuel flow into the engine; comparing the first air/fuel ratio and the second air/fuel ratio; and diagnosing an error condition of the oxygen sensor if the first air/fuel ratio does not meet a predetermined condition relative to the second air/fuel ratio. In this manner, the use of erroneous output of an oxygen sensor to adjust an engine operating condition may be avoided.

DETAILED DESCRIPTION OF THE DEPICTED EMBODIMENTS

As described in further detail herein, there may be significant variation in the output of an oxygen sensor, such as a UEGO sensor, under some operating conditions. One strategy to address this issue involves determining a first air/fuel ratio from the output of the sensor, determining a second air/fuel ratio from a pressure drop across an emissions system particulate filter in combination with other engine variables, and comparing the first air/fuel ratio and the second air/fuel ratio. Significant discrepancy of these two air/fuel ratios may indicate that the output of the oxygen sensor is erroneous. In some embodiments, two or more air/fuel ratios may be calculated from engine variables and compared to the air/fuel ratio determined from the oxygen sensor output to thereby provide additional certainty to the determination. Likewise, different methods of calculating air/fuel ratios may be used during different engine operating conditions. For example, one method of calculating an air/fuel ratio may be used during relatively richer operation, while another may be used during relatively leaner operation. In the event that a measured air/fuel ratio is determined to be erroneous, the erroneous measurement may be disregarded and a new measurement may be obtained from the oxygen sensor.

Figure 1:
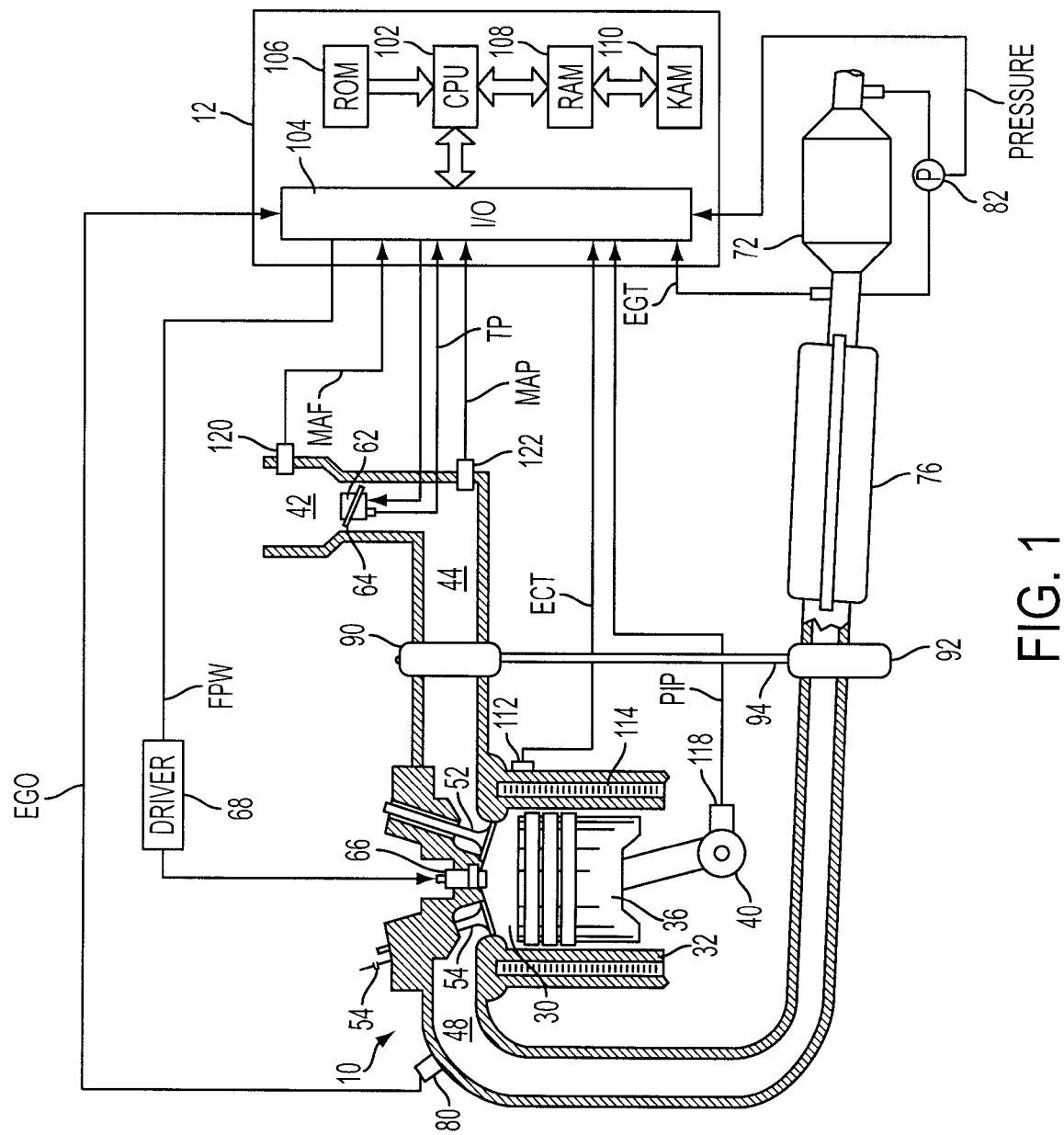
FIG. 1 shows an embodiment of an engine system.

Various examples of the approaches described herein may be understood with respect to an example engine and exhaust system, such as that described in FIG. 1. Specifically, FIG. 1 shows an example internal combustion engine 10 comprising a plurality of combustion chambers, only one of which is shown. The engine 10 may be controlled by electronic engine controller 12. In one example, engine 10 may be a common rail direct injection diesel engine.

Combustion chamber 30 of engine 10 includes combustion chamber walls 32 with piston 36 positioned therein and connected to crankshaft 40. Combustion chamber 30 is shown communicating with intake manifold 44 and exhaust manifold 48 via intake valve 52 and exhaust valve 54. While this example shows a single intake and exhaust valve, one or more cylinders may include a plurality of intake and/or exhaust valves.

Fuel injector 66 is shown directly coupled to combustion chamber 30 for delivering liquid fuel directly therein in proportion to the pulse width of signal fpw received from controller 12 via electronic driver 68. Fuel may be delivered by a fuel system (not shown) including a fuel tank, fuel pumps, and a common fuel rail (not shown). In some embodiments, engine 10 may include a plurality of combustion chambers each having a plurality of intake and/or exhaust valves.

Intake manifold 44 may include a throttle body 42 and a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may also include a mass air flow sensor 120 and a manifold air pressure sensor 122 for providing respective signals MAF and MAP to controller 12. Further, a turbocharger system is schematically shown, which comprises an intake compressor 90 and an exhaust turbine 92 connected by a shaft 94. While compressor 90 is shown in FIG. 1 as being downstream of throttle 62, it will be appreciated that compressor 90 may also be located upstream of throttle 62. Further, throttles may be located both upstream and downstream of compressor 90.

Catalytic converter 70 is shown in communication with exhaust manifold 48. In some embodiments, catalytic converter 70 may be a lean NOx trap (LNT). Further, a diesel particulate filter (DPF) 72 is shown downstream of catalytic converter 70. The DPF may operate actively or passively, and the filtering medium can be of various types of material and geometric construction. One example construction includes a wall-flow ceramic monolith comprising alternating channels that are plugged at opposite ends, thus forcing the exhaust flow through the common wall of the adjacent channels whereupon the particulate matter is deposited.

While this example shows the LNT upstream of a DPF, the DPF may also be positioned upstream of the LNT. Furthermore, other catalytic devices, including but not limited to a diesel oxidation catalyst (DOC, not shown), may be used. The NOx trap, DPF and/or other catalytic device may also be combined in one converter assembly, if desired. For example, although the LNT and DPF are normally viewed as separate entities, it is possible to combine the two on one substrate, e.g., a wall-flow ceramic DPF element coated with NOx storage agents and platinum group metals.

To provide more accurate control of engine operation and/or exhaust air-fuel ratio, one or more exhaust sensors may be used in the exhaust system. For example, a UEGO sensor 80 is provided to monitor an exhaust gas oxygen concentration, and to provide an exhaust gas oxygen signal to controller 12. Further, a differential pressure sensor 82 may be used to monitor a pressure drop across DPF 72, and a temperature sensor 84 may be used to monitor an exhaust gas temperature upstream of DPF 72. Further, various additional exhaust sensors may also be used, including but not limited to various NOx sensors, ammonia sensors, etc.

Controller 12 is shown in FIG. 1 as a microcomputer including: microprocessor unit 102, input/output ports 104, an electronic storage medium of executing programs and calibration values, shown as read-only memory (ROM) chip 106 in this particular example, random access memory (RAM) 108, keep alive memory (KAM) 110, and a data bus (I/O). Controller 12 may include code stored on computer readable medium that can be executed by the controller. Controller 12 is also shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122.

Combustion in engine 10 can be of various types, depending on operating conditions. While FIG. 1 depicts a compression ignition engine, it will be appreciated that the embodiments described herein may be used in any suitable engine, including but not limited to, diesel and gasoline compression ignition engines, spark ignition engines, direct or port injection engines, etc. Further, various fuels and/or fuel mixtures such as diesel, bio-diesel, etc, may be used.

As mentioned above, the output of UEGO sensor 80 may show relatively large variability at lean conditions, with sensor aging, during periods of high exhaust temperatures and/or pressures (such as during particulate filter regeneration), etc. Because controller 12 utilizes the output of UEGO sensor 80 to control various engine operating conditions, including but not limited to air mass flow, fuel flow, valve timing, injection timing, etc., variability in the output of UEGO sensor 80 may lead to controller 12 adjusting engine operating conditions based upon erroneous sensor output. To overcome such issues, controller 12 may be configured to verify the output of UEGO sensor 80 by comparing an air/fuel ratio determined from the sensor output with one or more air/fuel ratios calculated from other engine variables.

Controller 12 may utilize any suitable engine variables to calculate one or more air/fuel ratios for verifying the UEGO sensor output signal. For example, controller 12 may utilize a pressure drop across DPF 72, in combination with other engine variables, to calculate one or more air/fuel ratios for verifying the UEGO sensor output signal.

The pressure across DPF 72 is a function of the soot loading of the DPF. As the soot level in the DPF increases, the pressure differential across the DPF also increases for a given mass flow through the exhaust system. The soot loading may be mathematically expressed as $R_D$ by the following equation.

$$R_D = \left(\frac{1}{p_1 Q_{exh} \mu}\right) \frac{(p_1^2 - p_2^2)}{2R_{D0}} \tag{1}$$

In this equation, $p_1$=gas pressure upstream the DPF, $p_2$=gas pressure downstream the DPF, $R_{D0}$=a normalizing coefficient that normalizes Rd for a clean DPF to 1 (which may be referred to herein as a soot load factor), and $\mu$=dynamic viscosity. $Q_{exh}$ is given by the following equation.

$$Q_{exh} = (\dot{m}_{air} + \dot{m}_{fuel}) * 289 * \left(\frac{T}{p}\right) \tag{2}$$

In this equation, $\dot{m}_{air}$ and $\dot{m}_{fuel}$ are the mass air flow and fuel flow rates, respectively, into engine 10, T is the temperature of the exhaust upstream of DPF 72, and p is the pressure upstream of DPF 72.

The variables $\dot{m}_{air}$ and $\dot{m}_{fuel}$ are also related by the air/fuel ratio $\lambda$, which may be determined by the following equation, where C is equal to the stoichiometric air/fuel ratio.

$$\lambda = \left(\frac{1}{C}\right)\left(\frac{\dot{m}_{air}}{\dot{m}_{fuel}}\right) \tag{3}$$

These relationships allow separate calculations of the air/fuel ratio to be made from the mass air flow into engine 10 and from the mass fuel flow through the engine 10 using the measured pressure drop across the DPF 72 and the exhaust temperature upstream of the DPF 72, as follows.

$$\lambda = \left(\frac{1}{C}\right)\left[\left(\frac{1}{\dot{m}_{fuel} 289 T R_D \mu}\right)\frac{(p_1^2 - p_2^2)}{2R_{D0}} - 1\right] \tag{4}$$

$$\lambda = \left(\frac{1}{C}\right)\left[\frac{1}{\left[\left(\frac{1}{\dot{m}_{air} 289 T R_D \mu}\right)\frac{(p_1^2 - p_2^2)}{2R_{D0}}\right] - 1}\right] \tag{5}$$

In one embodiment, equation (4) is used to calculate the air/fuel ratio during relatively richer operation (which, in a diesel engine, may be a lean ratio closer to stoichiometry), while equation (5) is used to calculate the air/fuel ratio during relatively leaner operation (i.e. farther from stoichiometry). In another embodiment, air/fuel ratios are calculated by both equations (4) and (5), and both calculated air/fuel ratios are compared to the air/fuel ratio determined from the UEGO sensor output signal.

Figure 2:
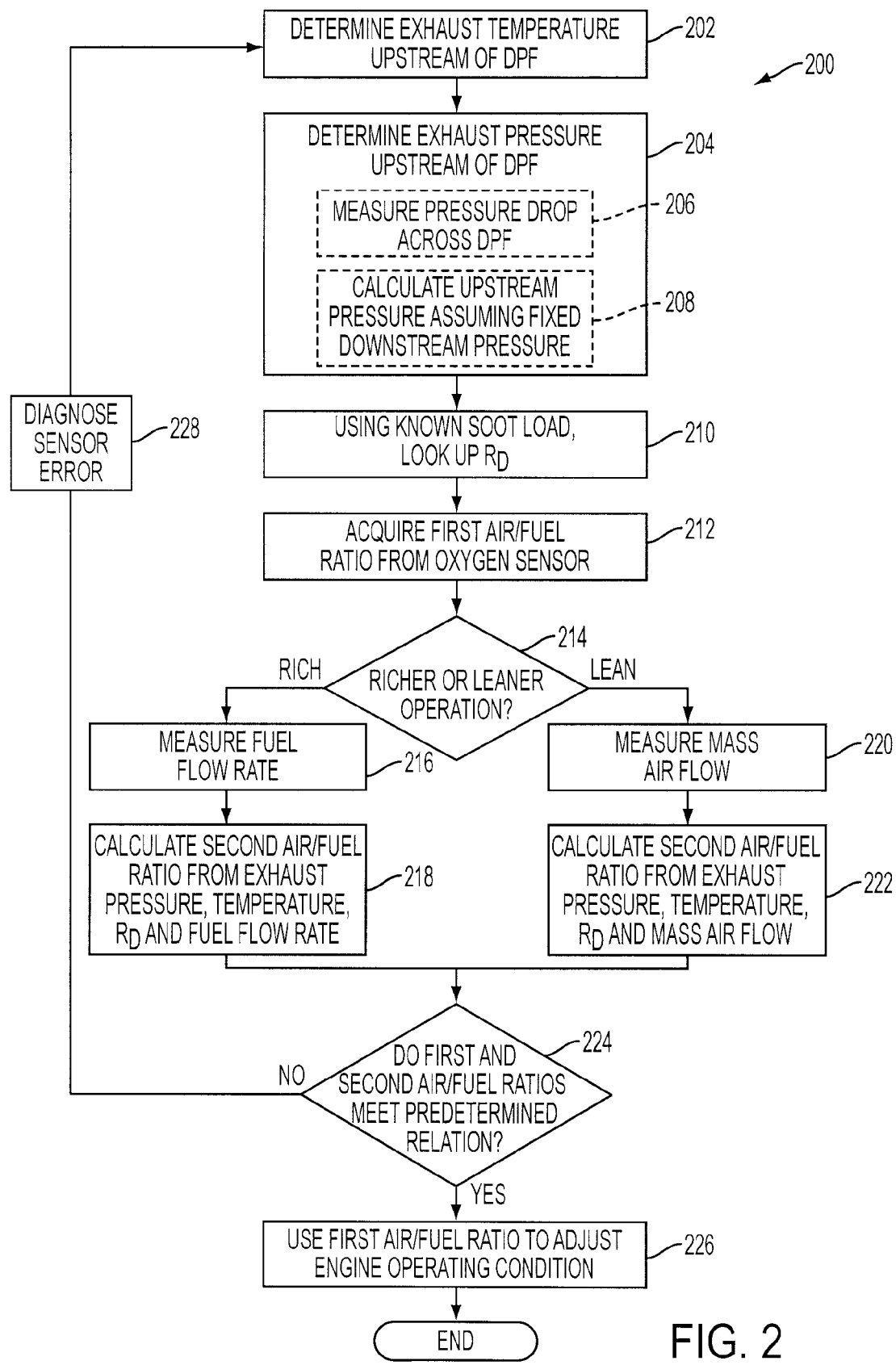
FIG. 2 shows a flow diagram depicting an embodiment of a method for monitoring a performance of an oxygen sensor.

FIG. 2 shows a flow diagram of an embodiment of a method 200 for monitoring a performance of an oxygen sensor. It will be appreciated that method 200 may be used with any suitable oxygen sensor, including but not limited to UEGO sensors. Method 200 first includes, at 202, determining an exhaust temperature upstream of the DPF, and at 204, determining an exhaust pressure upstream of the DPF. The exhaust temperature and pressure may be determined in any suitable manner. First regarding the exhaust temperature, the temperature may be directly measured via a sensor disposed in the exhaust system upstream of the DPF (as indicated at 84 in FIG. 1), and/or may be calculated from engine variables.

Next regarding the exhaust pressure upstream of the DPF, in one embodiment, the pressure may be determined by measuring a pressure drop across the DPF (at 206) for example, via differential pressure detector 82 in FIG. 1, and then calculating an upstream pressure by adding (at 208) the differential pressure to an assumed fixed downstream pressure. The assumed fixed downstream pressure may be atmospheric pressure where the DPF is the last exhaust treatment device in the exhaust conduit, may be somewhat higher than atmospheric pressure when other exhaust treatment devices are located downstream of the DPF, or may have any other suitable value.

Next, at 210, the soot load factor $R_D$ is determined, for example, via a look-up table based upon the differential pressure across the DPF and other engine variables (such as exhaust mass flow). Then, at 212, a first air/fuel ratio is acquired from the oxygen sensor, and it is determined, at 214, whether the engine is operating under richer or leaner conditions compared, for example, to a preselected air/fuel ratio, which may be leaner than stoichiometry. If the engine is operating under richer conditions, then a fuel flow rate is measured at 216, and a second air/fuel ratio is calculated, at 218, from the exhaust pressure upstream of the DPF, the exhaust temperature upstream of the DPF, $R_D$, and the fuel flow rate using equation (4) above. On the other hand, if the engine is operating under leaner conditions, then a mass air flow is measured, at 220, and a second air/fuel ratio is calculated, at 222, from the exhaust pressure upstream of the DPF, the exhaust temperature upstream of the DPF, $R_D$, and the mass air flow using equation (5) above.

Method 200 next comprises comparing, at 224, the first and second air/fuel ratios to determine if the first and second air/fuel ratios have a predetermined relationship to one another. Any suitable comparison may be made of the first and second air/fuel ratios. For example, it may be determined whether the first ratio is within a preselected percentage of the second ratio, whether the first ratio is within a preselected number of statistical deviations of the second ratio, etc.

If it is determined that the first and second air/fuel ratios meet the predetermined relationship to one another, then method 200 comprises, at 226, using the first air/fuel ratio to adjust an engine operating condition. On the other hand, if it is determined at the first and second air/fuel ratios do not meet the predetermined relationship to one another, then the first air/fuel ratio is diagnosed at 228 as an error. In this case, method 200 returns to 202 and begins anew. New values of the exhaust temperature and temperature are acquired, a new first air/fuel ratio is acquired, and a new second air/fuel ratio is calculated and compared to the first air fuel ratio. If the new first air/fuel ratio is found to meet the predetermined relationship with the new second air/fuel ratio, then the new first air/fuel ratio is used, at 228, to adjust an engine operating condition. In this manner, method 200 may loop until an air/fuel ratio determined to be of sufficient reliability is acquired. In some embodiments, the occurrence of repeated error diagnoses, or even a single error diagnosis, may trigger an indicator light to alert an operator of the sensor error.

Figure 3:
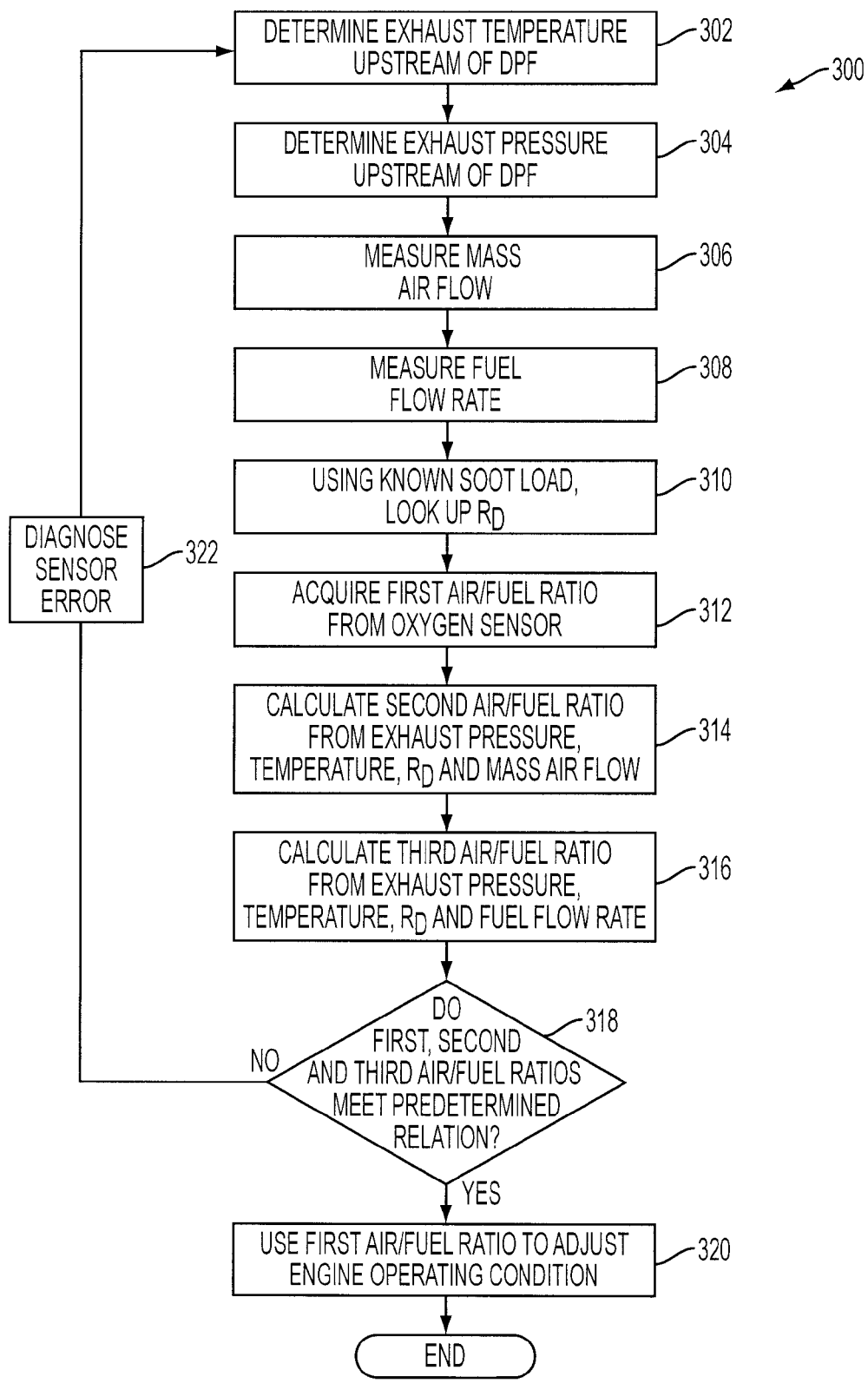
FIG. 3 shows a flow diagram depicting another embodiment of a method for monitoring a performance of an oxygen sensor.

FIG. 3 shows a flow diagram of another embodiment of a method for monitoring a performance of an oxygen sensor in an exhaust system. Method 300 comprises, at 302, determining an exhaust temperature upstream of the DPF, and, at 304, determining an exhaust pressure upstream of the DPF, as described above for method 200. Method 300 further comprises measuring a mass air flow (at 306), measuring a fuel flow rate (at 308), and looking up the DPF soot loading factor $R_D$ (at 310).

Next, method 300 comprises, at 312, acquiring a first air/fuel ratio from an oxygen sensor. Further, method 300 comprises, at 314 and 316, calculating second and third air/fuel ratios. The second air/fuel ratio is calculated from the exhaust pressure upstream of the DPF (for example, as determined from a differential pressure measurement across the sensor), the exhaust temperature upstream of the DPF, $R_D$, and the measured mass air flow, while the third air/fuel ratio is calculated from the exhaust pressure upstream of the DPF, the exhaust temperature upstream of the DPF, $R_D$, and the measured fuel flow rate. Next, it is determined at 318 whether the first, second, and third air/fuel ratios meet a predetermined relationship (or one or more predetermined relationships) to one another. If so, then the first air/fuel ratio is used, at 320, to adjust an engine operating condition. On the other hand, if it is determined at the first, second and third air/fuel ratios do not meet the predetermined relationship to one another, then the sensor reading is diagnosed at 228 as erroneous, and method 300 returns to 302 to begin anew. In this manner, method 300 may loop (as described above for method 200) until an air/fuel ratio determined to be of sufficient reliability is acquired. Any suitable predetermined relationship may be used to determine whether the first, second and third air/fuel ratios are within sufficiently close agreement to determine that the reading is not in error. For example, it may be determined whether the first ratio is within a preselected percentage of the both the second and third ratios, whether the first ratio is within a preselected number of statistical deviations of the second and third ratios, etc.

It will be appreciated that the steps of methods 200 and 300 may be performed in any suitable order, including but not limited to those shown, and/or that one or more steps may be performed in parallel in various embodiments. Additionally, while described in the context of a UEGO sensor, it will be appreciated that the concepts described herein may be used with any other suitable sensor, including but not limited to a combination UEGO/NOx sensor. Further, it will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. In an apparatus comprising an internal combustion engine, an exhaust conduit, a particulate filter disposed along the exhaust conduit, an oxygen sensor disposed along the exhaust conduit, and a pressure sensor disposed along the exhaust conduit, a method of diagnosing a performance of an oxygen sensor, comprising:

determining a first air/fuel ratio from a signal from an exhaust oxygen sensor;

determining a second air/fuel ratio from a temperature upstream of the particulate filter, a pressure differential across the particulate filter and one or more of an airflow into the engine and a fuel flow into the engine;

comparing the first air/fuel ratio and the second air/fuel ratio; and diagnosing an error condition of the oxygen sensor if the first air/fuel ratio does not meet a predetermined condition relative to the second air/fuel ratio.

2. The method of claim 1, wherein the second air/fuel ratio is determined from the airflow into the engine, and further comprising determining the second air/fuel ratio during operation leaner than a preselected air/fuel ratio.

3. The method of claim 1, wherein the second air/fuel ratio is determined from the fuel flow into the engine, and further comprising determining the second air/fuel ratio during operation richer than a preselected air/fuel ratio.

4. The method of claim 1, further comprising determining the pressure upstream of the particulate filter from the pressure differential across the particulate filter.

5. The method of claim 1, further comprising determining a new first air/fuel ratio from another signal received from the oxygen sensor if an error condition is diagnosed.

6. The method of claim 5, further comprising adjusting an engine operating condition based upon the new first air/fuel ratio.

7. The method of claim 1, further comprising determining an exhaust temperature upstream of the particulate filter via a temperature sensor.

8. In an apparatus comprising an internal combustion engine, an exhaust conduit, a particulate filter disposed along the exhaust conduit, an oxygen sensor disposed along the exhaust conduit, and a pressure sensor disposed along the exhaust conduit, a method of monitoring a performance of the oxygen sensor, comprising:

determining whether an air/fuel ratio supplied to the engine is richer or leaner than a preselected air/fuel ratio;

determining a first air/fuel ratio from a signal received from the oxygen sensor;

if the air/fuel ratio supplied to the engine is rich, determining a second air/fuel ratio from a pressure upstream of the particulate filter and a fuel flow into the engine;

if the air/fuel ratio supplied to the engine is lean, determining a third air/fuel ratio from the pressure upstream of the particulate filter and an air flow into the engine;

comparing first air/fuel ratio with the second or third air/fuel ratio; and diagnosing an error condition of the oxygen sensor if the first air/fuel ratio does not meet a predetermined condition relative to the second or third air/fuel ratio.

9. The method of claim 8, further comprising determining the pressure upstream of the particulate filter from a pressure differential across the particulate filter.

10. The method of claim 8, further comprising determining a new first air/fuel ratio from another signal received from the oxygen sensor if an error condition is diagnosed.

11. The method of claim 10, further comprising adjusting an engine operating condition based upon the new first air/fuel ratio.

12. An apparatus comprising an internal combustion engine;

an exhaust conduit;

a particulate filter disposed along the exhaust conduit;

an oxygen sensor disposed along the exhaust conduit;

a pressure sensor disposed along the exhaust conduit; and a controller configured to determine a first air/fuel ratio from a signal from the oxygen sensor, to determine a second air/fuel ratio from a pressure differential upstream of particulate filter and one or more of an airflow into the engine and a fuel flow into the engine, to compare the first air/fuel ratio and the second air/fuel ratio, and to diagnose an error condition of the oxygen sensor if the first air/fuel ratio does not meet a predetermined condition relative to the second air/fuel ratio.

13. The apparatus of claim 12, wherein the controller is configured to determine the second air/fuel ratio from the airflow into the engine, and wherein the controller is further configured to determine the second air/fuel ratio during conditions leaner than a preselected air/fuel ratio.

14. The apparatus of claim 12, wherein the controller is configured to determine the second air/fuel ratio from the fuel flow into the engine, and wherein the controller is further configured to determine the second air/fuel ratio during conditions richer than a preselected air/fuel ratio.

15. The apparatus of claim 12, wherein the pressure sensor is a differential pressure sensor configured to output a signal that is a function of a pressure across the particulate filter.

16. The apparatus of claim 12, wherein the controller is configured to receive a new signal from the oxygen sensor and to determine a new first air/fuel ratio from the new signal from the oxygen sensor if an error condition is diagnosed.

17. The apparatus of claim 16, further comprising adjusting an engine operating condition based upon the new first air/fuel ratio.

* * * * *